United States Patent
May et al.

(10) Patent No.: US 9,594,820 B2
(45) Date of Patent: *Mar. 14, 2017

(54) APPARATUS, AND ASSOCIATED METHOD, FOR SYNCHRONIZING A GROUP OF DATA OBJECTS

(71) Applicant: BlackBerry Limited, Waterloo (CA)

(72) Inventors: Darrell Reginald May, Waterloo (CA); Andrew John Ewanchuk, Baden (CA); Carl Lloyd Cherry, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,847

(22) Filed: Dec. 28, 2015

(65) Prior Publication Data

US 2016/0110440 A1    Apr. 21, 2016

Related U.S. Application Data

(63) Continuation of application No. 13/414,503, filed on Mar. 7, 2012, now Pat. No. 9,223,842.

(60) Provisional application No. 61/566,769, filed on Dec. 5, 2011.

(51) Int. Cl.
    *G06F 17/30* (2006.01)
    *G06F 11/14* (2006.01)

(52) U.S. Cl.
    CPC .... *G06F 17/30578* (2013.01); *G06F 11/1443* (2013.01); *G06F 17/30368* (2013.01); *G06F 17/30575* (2013.01); *G06F 2201/80* (2013.01)

(58) Field of Classification Search
    CPC .................................................. G06F 17/30575
    See application file for complete search history.

(56) References Cited

U.S. PATENT DOCUMENTS

| | | | |
|---|---|---|---|
| 8,527,995 B2 * | 9/2013 | Onianwa | G06F 9/466 707/610 |
| 2006/0206768 A1 * | 9/2006 | Varghese | G06F 17/30578 714/48 |
| 2007/0162518 A1 * | 7/2007 | Tian | H04L 9/0838 |
| 2009/0307280 A1 * | 12/2009 | McCarthy | G06F 17/30884 |
| 2010/0145910 A1 * | 6/2010 | Zhao | G06F 17/30348 707/620 |
| 2010/0146133 A1 | 6/2010 | Perrin et al. | |
| 2011/0161371 A1 * | 6/2011 | Thomson | G06F 17/30398 707/792 |
| 2011/0185247 A1 * | 7/2011 | Gavrilov | H04L 67/06 714/748 |

(Continued)

FOREIGN PATENT DOCUMENTS

EP    1271321 A1    1/2003

*Primary Examiner* — Alicia Willoughby
(74) *Attorney, Agent, or Firm* — Jeffrey N. Giunta; Fleit Gibbons Gutman Bongini & Bianco P.L.

(57) ABSTRACT

An apparatus, and an associated method, facilitates synchronization of a group of data objects. Batches of data objects are iteratively processed. When a synchronization response indicates that the data of the request is unsynchronizable, data associated with the synchronization request is marked. A retry procedure is subsequently utilized to attempt synchronization of the marked data objects and to determine the individual data objects that cannot be synchronized.

19 Claims, 7 Drawing Sheets

(56) References Cited

U.S. PATENT DOCUMENTS

2013/0066829 A1\* 3/2013 Wallace ............ G06F 17/30578
707/610

\* cited by examiner

APPARATUS, AND ASSOCIATED METHOD, FOR SYNCHRONIZING A GROUP OF DATA OBJECTS

The present disclosure relates generally to a manner by which to synchronize a group of data objects. More particularly, the present disclosure relates to a synchronization apparatus, and an associated method, by which to synchronize successive batches of data objects related to the device dataset and to identify batches of the data objects for which synchronization requests result in return of unsynchronizable responses. Subsequent to completion of synchronization of the synchronizable batches of data objects, synchronization of the identified batches of the data objects is again attempted using a retry procedure.

BACKGROUND

Communication networks provide for communication connectivity between communication devices to permit the communication of data between the devices. Many varied types of communication networks have been deployed. Some of such communication networks provide for communication of data by way of wired connections, and some other of such communication networks provide for communication of data by way of radio connections. Interconnectivity provided between different networks provides for communication of data between communication devices connected to different communication networks.

Exemplary communication devices include processing devices, such as personal computers, personal digital assistants (PDAs), wireless devices, such as mobile phones, smart phones, and other radio communication devices.

Communication devices sometimes include data stores, herein referred to as databases, typically containing a plurality of data entries or records. Any of various databases are created and maintained at a communication device. For example, a wireless device having messaging capability, such as email messaging capability, maintains a message database formed of data entries or records each comprised of a message. The data records of a message database, as well as data records of another type of database, are often times backed-up at a remote location. Back-up of the data records, and resultant database, at the remote location permits the data to be recovered in the event that the data is corrupted or lost at the device at which the database is maintained. The back-up copy of the database is also used to install the database at a new or replacement communication device.

A synchronization operation is performed to synchronize the database maintained at the communication device and the database maintained at the remote location. A synchronization request and response procedure is sometimes utilized. Various problems can result when synchronizing a database with a back-up copy. For instance, if an unknown response to a synchronization request is returned, synchronization is not properly carried out. And, sometimes, an account associated with the database is disabled in the event that multiple, successive synchronization requests are generated.

DETAILED DESCRIPTION

Figure 1:
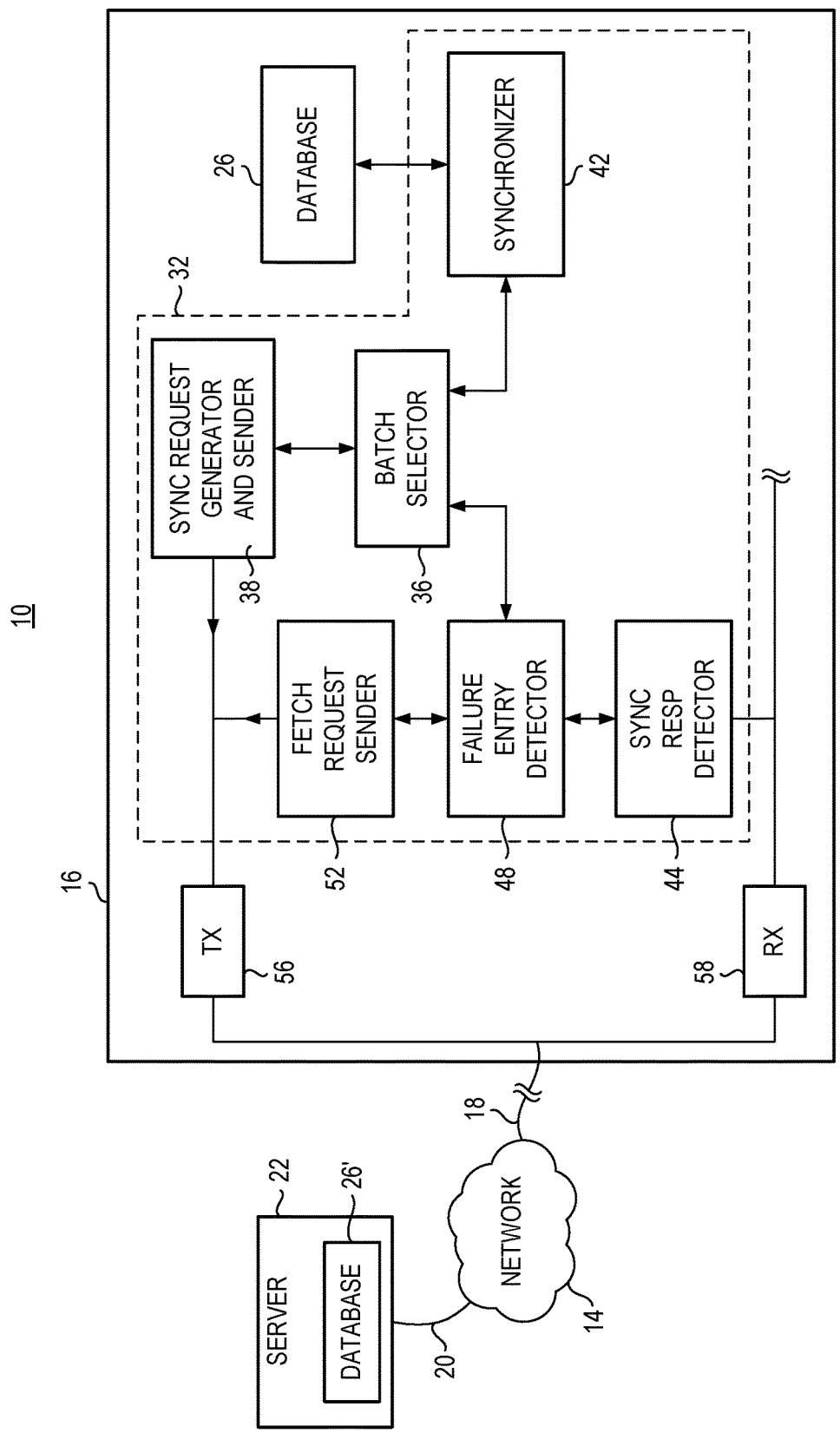
FIG. 1 illustrates a functional block diagram of a communication system in which an implementation of the present disclosure is embodied.

The present disclosure, accordingly, advantageously provides an apparatus and an associated method, by which to synchronize data of a database.

In one aspect of the present disclosure, a manner is provided by which to synchronize successive batches of data records of the database and to identify portions of the data for which synchronization requests result in return of unsynchronizable responses.

By identifying an unsynchronizable response, repeated attempts to synchronize the associated data do not occur, and a retry loop, and associated problems, does not result.

In another aspect of the present disclosure, subsequent to completion of synchronization of the synchronizable portions of the database, synchronization of the identified portions of the data for which the synchronization requests resulted in return of unsynchronizable responses is again attempted through use of a retry procedure.

In another aspect of the present disclosure, when an unsynchronizable response is detected, a smart synchronization state is entered. While in the smart synchronization state, synchronization requests are made for only portions of the batch of data associated with the unsynchronizable response. The portions are selected in any of various manners. In one implementation, synchronization is attempted individually on each data record of the data associated with the unsynchronizable response. In another implementation, synchronization is attempted of decreasing fractional portions of the associated data records until these synchronizable data entries are synchronized, and the unsynchronizable data record or group of records is identified.

In another aspect of the present disclosure, a database is maintained at, or in connectivity with, a communication device. The communication device initiates a synchronization session by generating and sending a synchronization request. The synchronization request includes identification of a portion, such as a range of data records, of the data of the database that is to be synchronized. The synchronization request is routed to a synchronization receiver, such as a server at which the corresponding database is embodied. Once detected, the synchronization data associated with the synchronization request is accessed, and a synchronization response to the synchronization request is formed. If synchronization data cannot be provided, the synchronization response forms an indication of the failure to obtain the synchronization data. The indication of such failure comprises, for instance, a non-document return code or other failure entry. The non-document return code is inserted into or otherwise forms part of a synchronization response. The synchronization response is routed to the initiating communication device.

The synchronization response, when delivered to the communication device is detected. The contents of the synchronization response are accessed, and the contents are utilized to perform synchronization of the portion of the data of the database when the synchronization response includes synchronization data. In the event that the synchronization response comprises an indication that the data portion is unsynchronizable, the device marks each data record of the associated batch of data, indicated to be unsynchronizable, to be data entries for which synchronization should not immediately be attempted. That is to say, in contrast to conventional synchronization schemes, repeated attempts are not made to synchronize the same batch of data, thereby to avoid occurrence of a retry loop.

In another aspect of the present disclosure, the synchronization process is performed upon other portions of data, if other portions of data of the database remain to be synchronized. Thereby, all portions of the data of the database are synchronized except for portions that are indicated, by synchronization responses, to be unsynchronizable.

In another aspect of the present disclosure, once synchronization has been carried out upon the synchronizable portions of the data of the database, a retry procedure is undertaken to attempt to synchronize the data records of the portion of the database indicated to be unsynchronizable. In the retry procedure, synchronization requests are generated to synchronize parts of the portion of the data that had been indicated to be unsynchronizable. That is to say, portions, which form sub-portions, of the portion of the data identified to be unsynchronizable, undergo synchronization. In one implementation, a synchronization request is generated for each sequential data record of the portion indicated to be unsynchronizable. If a data record is synchronizable, then a synchronization response containing synchronization data is provided in response to the synchronization request. A synchronization request for a data record that is not synchronizable is identified with a synchronization response that indicates the data record to be unsynchronizable. The unsynchronizable data record is not synchronized. In another implementation, the sub-portion of the portion comprises a fractional portion. For instance, the portion is divided into half, and a synchronization request is generated for synchronization data associated with the one-half of the portion. If the synchronization response to the synchronization request indicates the sub-portion to be synchronizable, then the unsynchronizable portion is in the other sub-portion of the portion. The sub-portion is further divided, and a synchronization request is generated pertaining to the smaller sub-portion. The procedure is repeated until all of the unsynchronizable data records are identified.

In another aspect of the present disclosure, once a data record is determined to be unsynchronizable, a fetch command, or other appropriate command, is generated to request the value of the data record, if the value is available at the database copy. The database is thereby placeable in total match with the database copy.

In these and other aspects, therefore, an apparatus and an associated method, is provided for facilitating synchronization of a database of a device. A determination is made of whether a first synchronization response provided to the device to synchronize data of a selected batch of data includes a failure entry that causes synchronization failure of the batch of data. Synchronization is completed of the database exclusive of the selected batch of data associated with the first synchronization response.

Turning first, therefore, to FIG. 1, a communication system, shown generally at 10, includes communication devices that are placeable in communication connectivity by way of a communication network 14. The network is implemented in any desired manner in which communication connectivity is provided between the communication devices. The network, e.g., comprises, a radio network in which a communication path formed between communication devices includes one or more radio channels. Exemplary radio networks include cellular or WiFi networks.

Communication devices, here a device 16 and a communication server 22, are placed in communication connectivity with the device 16. The line 18 is representative of communication paths extending between the device 16 and the network 14, and the line 20 is representative of communication paths extending between the server 22 and the network 14. Communication signals, formed of data or other information, that are generated either by the device 16 or by the server 22, are routed by way of the network 14. In the implementation shown in FIG. 1, the device 16 forms a radio device, such as a smart phone or a computing device, such as a tablet computer having radio connectivity. In other implementations, the device 16 is implemented in other manners, such as, e.g., by way of wired connections.

The device 16 includes one or more databases 26. The database 26 is representative of a database maintained at the device 16. The database 26 comprises, e.g., a message database, such as an email database in which data records or entries of the database comprise individual messages. The server 22 maintains a database 26' that forms a copy of the database 26 maintained at the device 16. Here, the database 26' is a back-up copy of the database 26 or is otherwise formed of data records that are intended to be stored at the database 26 of the device 16.

When the database 26 is to be synchronized with the copy 26', synchronization requests and responses are communicated between the device 16 and the server 22. For instance, if the device 16 forms the initiating device, synchronization requests are generated by the device 16 and communicated to the server 22. And, synchronization responses to the synchronization requests are generated by the server 22. As mentioned previously, a problem occurs in the event that a synchronization response indicates the data identified in a synchronization request is unsynchronizable. Conventionally, such a synchronization response precipitates another synchronization request. Successive requests and responses are generated, resulting in a retry loop of multiple requests and corresponding responses indicating unsynchronizable data. An operator of the server 22, such as an email or other message service provider sometimes invalidates the account associated with the data in which the synchronization results in the retry loop.

Accordingly, pursuant to an implementation of the present disclosure, the device 16 includes an apparatus 32 of an implementation of the present disclosure. The apparatus 32 is functionally represented in FIG. 1 and is implementable in any desired manner, including hardware elements, program codes executable by processing circuitry, firmware elements, and combinations thereof. While not separately shown, in another implementation, other devices of the communication system 10, including the server 22, include the apparatus 32. The apparatus 32 includes a batch selector 36, a synchronization request generator and sender 38, a synchronizer 42, a synchronization response detector 44, a failure entry detector 48, and a fetch request sender 52.

The apparatus 32 is coupled to transceiver circuitry formed of a transmitter 56 and a receiver 58. When the database 26 is to be synchronized, the batch selector 36 selects a batch of data records of the database to be synchronized. The batch identifies a portion of the database, i.e., a group of database records. Indications of the selected batch are provided to the synchronization request generator and sender 38. The generator and sender 38 generates a synchronization request that includes information identifying the batch selected by the selector 36, any other appropriate information, and routing information that identifies the server 22. The synchronization request is provided to the transmitter 56 and is transmitted therefrom for delivery to the server 22 by way of communication paths 18 and 20 and the network 14.

If the request of synchronization data can be obtained by the server 22, normal operation ensues. That is to say, synchronization response includes synchronization data. If synchronization data cannot be obtained, the synchronization response indicates the failure to obtain the synchronization data. The indication comprises, for instance, a non-document return code.

The synchronization response is delivered to the receiver 58 of the transceiver of the device 16, and the response is detected by the synchronization response detector 44. Indications of the detected response are provided to the failure entry detector 48. The failure entry detector determines whether the synchronization response includes a failure entry, i.e., an indication that the batch is unsynchronizable. The indication comprises, e.g., a non-document return code. Indications of determinations made by the detector are provided to the synchronizer 42. The synchronizer 42 operates to synchronize the batch of data if the synchronization response included synchronization data. If, conversely, the synchronization response indicated unsynchronizable data, i.e., included a failure entry, then the synchronizer marks each data record of the batch as unsynchronizable. Repeated retries of synchronization of the batch are not attempted.

Synchronization of successive batches of data records of the database 26 is attempted to synchronize all of the synchronizable data records of the database. Successive batches are selected by the batch selector 36, and successive synchronization requests are generated and sent. Correspondingly, successive synchronization responses are returned to the device 16. The detector 44 detects each of the responses and provides indications to the failure entry detector 48. For each synchronization response, if a determination is made that the response includes information permitting the batch of data to be synchronized, the synchronizer 42 performs the synchronization of the data records of the batch. If, conversely, the synchronization response is determined to indicate the associated batch of data records to be unsynchronizable, the synchronizer 42 marks each data record of the associated batch and does not immediately attempt to retry synchronization of the entire batch.

Rather, a retry procedure is performed upon portions of the data records of batches identified to be unsynchronizable. In this further operation, the batch portion selector 36 is further operable to select a portion of a batch identified to be unsynchronizable, to be synchronized pursuant to a retry procedure. A synchronization request is generated and sent by the generator and sender 38 to attempt to synchronize this portion of the batch. The portion of the batch is, e.g., a single data record of the batch, and successive synchronization requests are made for successive data records of the batch. Thereby, synchronization is performed upon each synchronizable data record of the batch. In an alternate implementation, the portions of the batch are fractional portions in which successively-smaller fractional portions of the batch are selected until a portion containing an unsynchronizable data record is identified. The retry procedure, in one implementation, is carried out immediately after the data records are identified as being unsynchronizable. In another implementation, the retry procedure is carried out after synchronization has been attempted with all of the batches.

In the exemplary implementation, when an unsynchronizable data record is identified, an indication is provided to the request sender 52 by the failure entry detector 48 that makes such determination. And, the fetch request sender 52 generates and sends, by way of the transmitter 56 a fetch request for the value of the unsynchronizable data record. The value, obtained at the database 26', is returned to the device 16, provided to the synchronizer 42, and compared with the corresponding value, or otherwise substituted for the corresponding value, stored at the database 26.

Thereby, synchronization is carried out without occurrence of a retry loop that might result in disabling of the folder or account associated with the database.

Figure 2A:
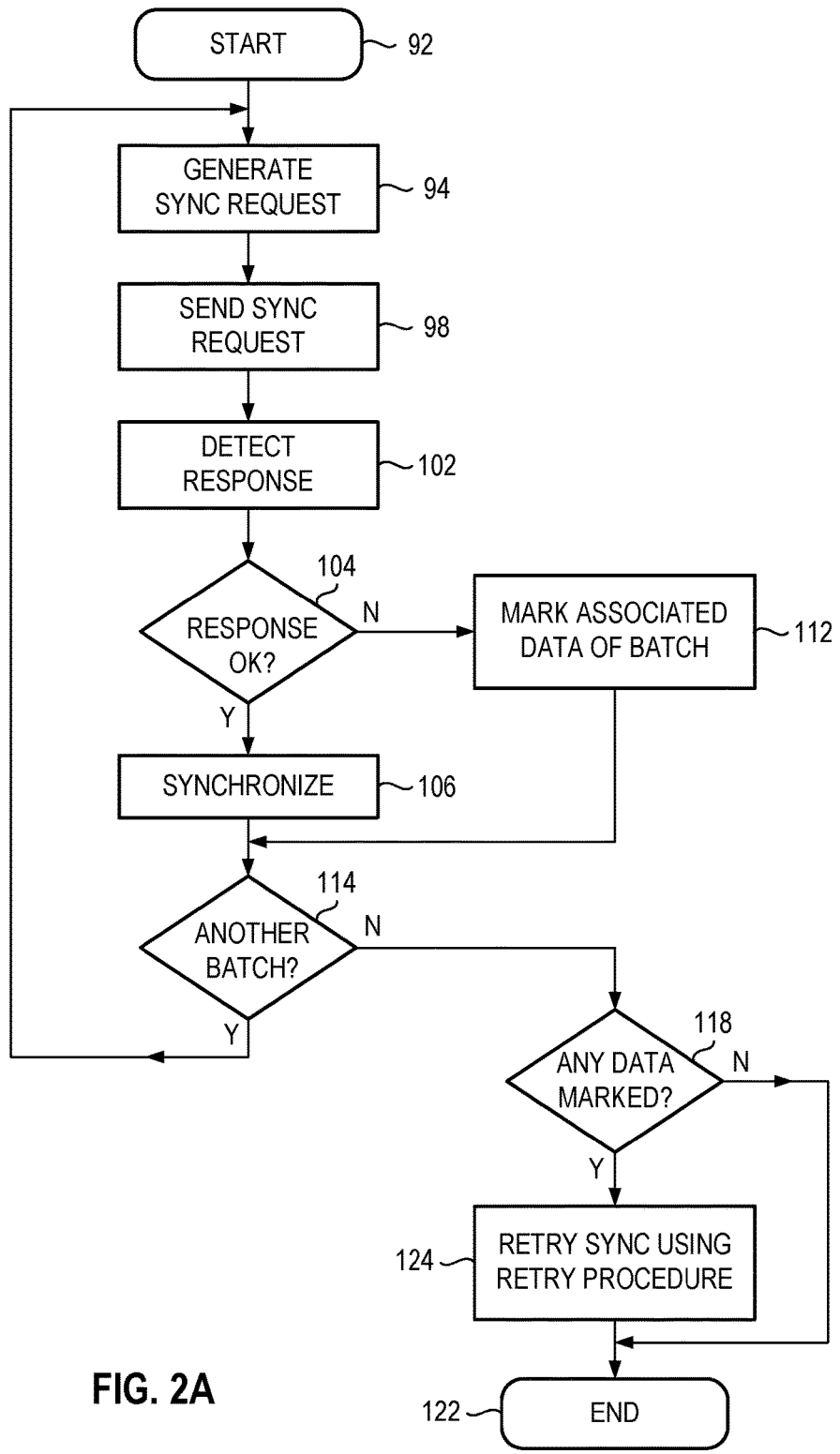
FIGS. 2A and 2B illustrate process diagrams representative of exemplary operation of an implementation of the present disclosure.

FIG. 2A illustrates a process 88 performed pursuant to operation of an implementation of the present disclosure. The process is performed pursuant to synchronization of the database of the device.

Subsequent to entry, indicated by the start block 92, a synchronization request is generated, indicated by the block 94. The synchronization request is a request to synchronize a batch of data. In exemplary operation of the process, data records of a database are divided into a plurality of batches. The process 88 provides for synchronization of all of the batches that together form the database that is to be synchronized, and the generation of the synchronization request at the block 94 is iteratively performed for each batch of data. Once generated, the synchronization request is sent, indicated by the block 98. And, as indicated by the block 102, a response to the request is detected.

Then, and as indicated by the decision block 104, a determination is made as to whether the synchronization response indicates that the batch of data is synchronizable. If yes, then the yes branch is taken to the block 106, and the batch of data is synchronized. The synchronization response, e.g., includes the synchronization data responsive to the synchronization request.

If, conversely, the synchronization response indicates the batch to be unsynchronizable, the no branch is taken to the block 112, and the data records of the batch identified to be unsynchronizable are marked or otherwise indicated to have failed the synchronization effort.

Branches from the block 106 and 112 extend to the decision block 114. At the decision block 114, a determination is made as to whether another batch of the data records of the database remain to be synchronized. If so, the yes branch is taken back to the block 94, and a synchronization request is generated for the next batch of data records of the database. If, conversely, no additional batches of data records remain to be synchronized, the no branch is taken from the decision block 114 to the decision block 118. At the decision block 118, determination is made as to whether any data records or batch of data records are marked as being unsynchronizable. If not, the no branch is taken to the end block 122. If, conversely, data records are marked, the yes branch is taken to the block 124 and synchronization is reattempted, i.e., retried, using a retry procedure. The retry procedure both provides for synchronization of the data records and also to identify an unsynchronizable data record.

Figure 2B:
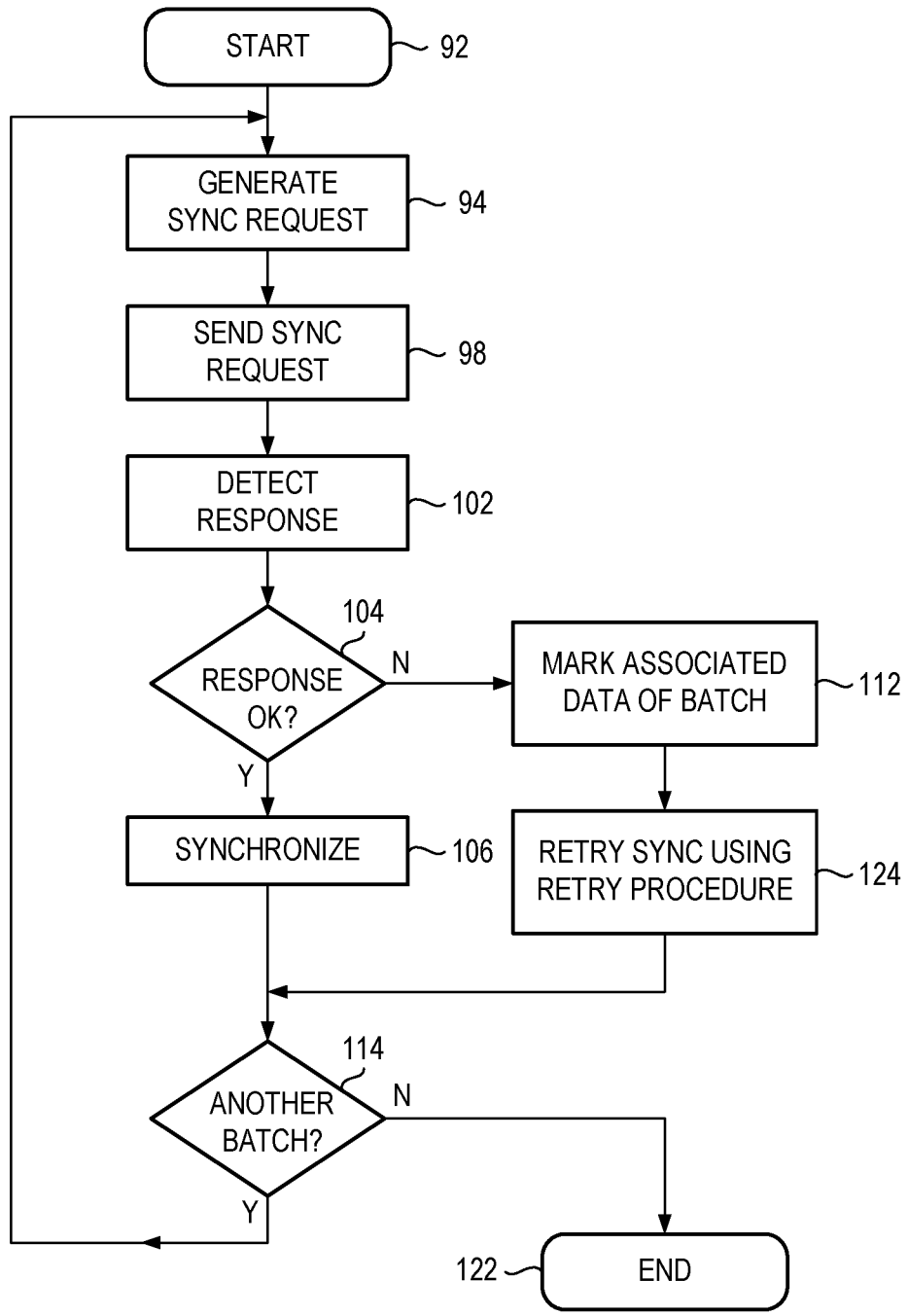

FIG. 2B illustrates the process 88 of an alternate implementation. The process 88 shown in FIG. 2B is similar to that shown in FIG. 2A and includes commonly-referenced steps and decision blocks 92, 94, 98, 102, 104 and 106. The process shown in FIG. 2B provides for the performance of the retry procedure at the block 124 immediately subsequent to the marking at block 112 of the data records of a batch that is determined at the decision block 104 to be unsynchronizable. Paths are taken from the blocks 106 and 124 to the decision block 114.

Figure 3:
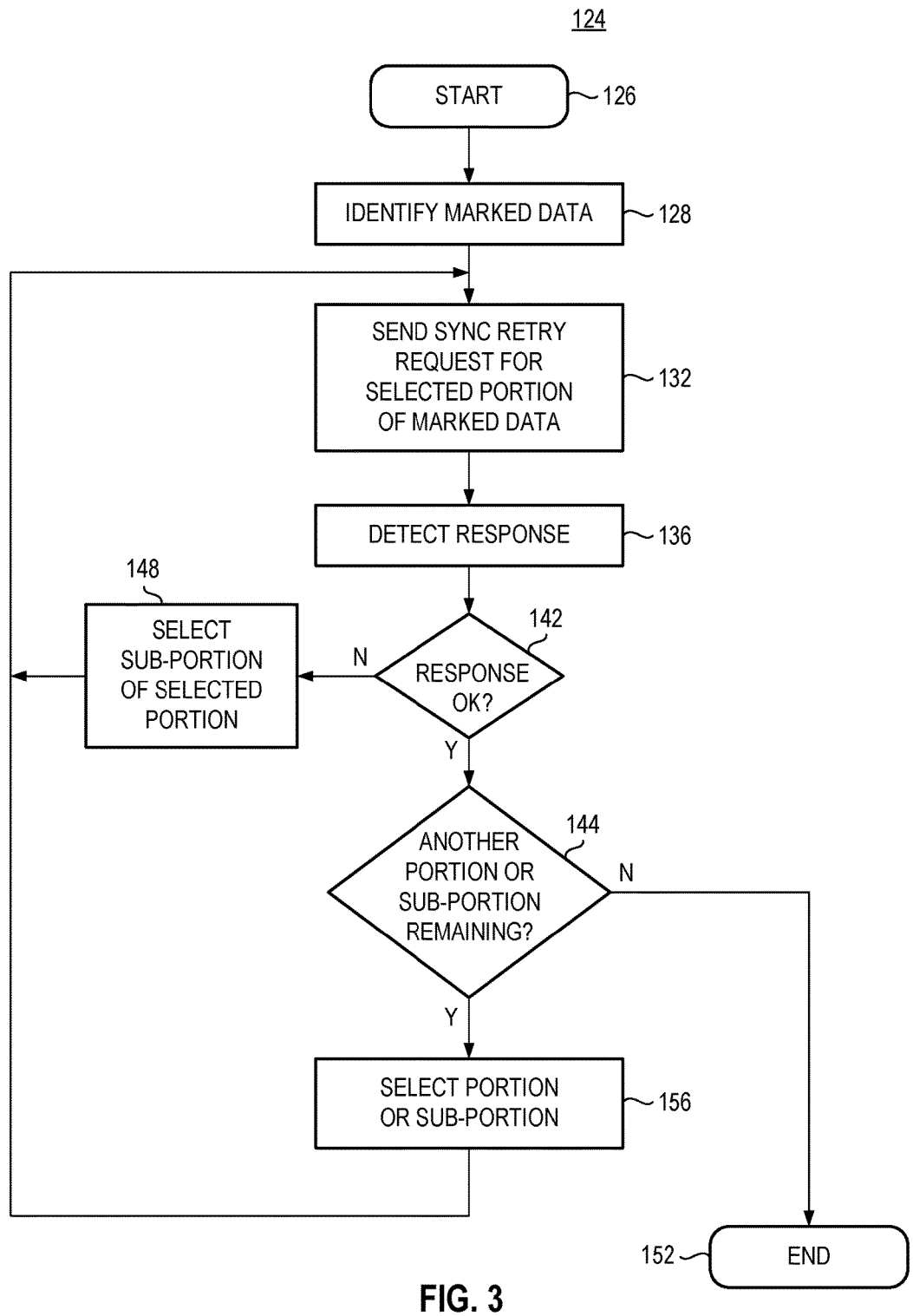
FIG. 3 illustrates a process diagram that is also representative of exemplary operation of an implementation of the present disclosure.

FIG. 3 illustrates an exemplary retry procedure 124, which forms part of the process 88 shown in FIGS. 2A-2B. The retry procedure is utilized to identify unsynchronizable data records and to synchronize synchronizable data records of one or more batches of data records that have been indicated to be unsynchronizable.

First, after entry, indicated by the start block 126, marked data records are identified, indicated by the block 128. The marked data is marked to indicate that the marked data is associated with a batch of data records that is considered to be unsynchronizable.

Then as indicated by the block 132, a synchronization request, i.e., a retry request, is sent for a selected portion of the marked data. Prior to sending the request, the selected portion of the marked data is selected. A single data record is, or a group of data records are, selectable. Then, and as indicated by the block 136, a response to the request is detected.

A determination is then made, indicated by the decision block 142 as to whether the response indicates that the portion of the marked data is synchronizable. If so, the yes branch is taken to the decision block 144. Otherwise, the no branch is taken to the block 148. At the block 148, a sub-portion of the selected portion, or, alternately, a subsequent data record if the portion comprises a single data record, is selected, and a branch is taken back to the block 132.

At the decision block 144, a determination is made as to whether another portion or sub-portion of the marked data remains. If not, the no branch is taken to the end block 152. If, conversely, a portion or sub portion remains, the yes branch is taken to the block 156. At the block 156, the portion or sub-portion is selected, and a branch is taken back to the block 132.

Figure 4:
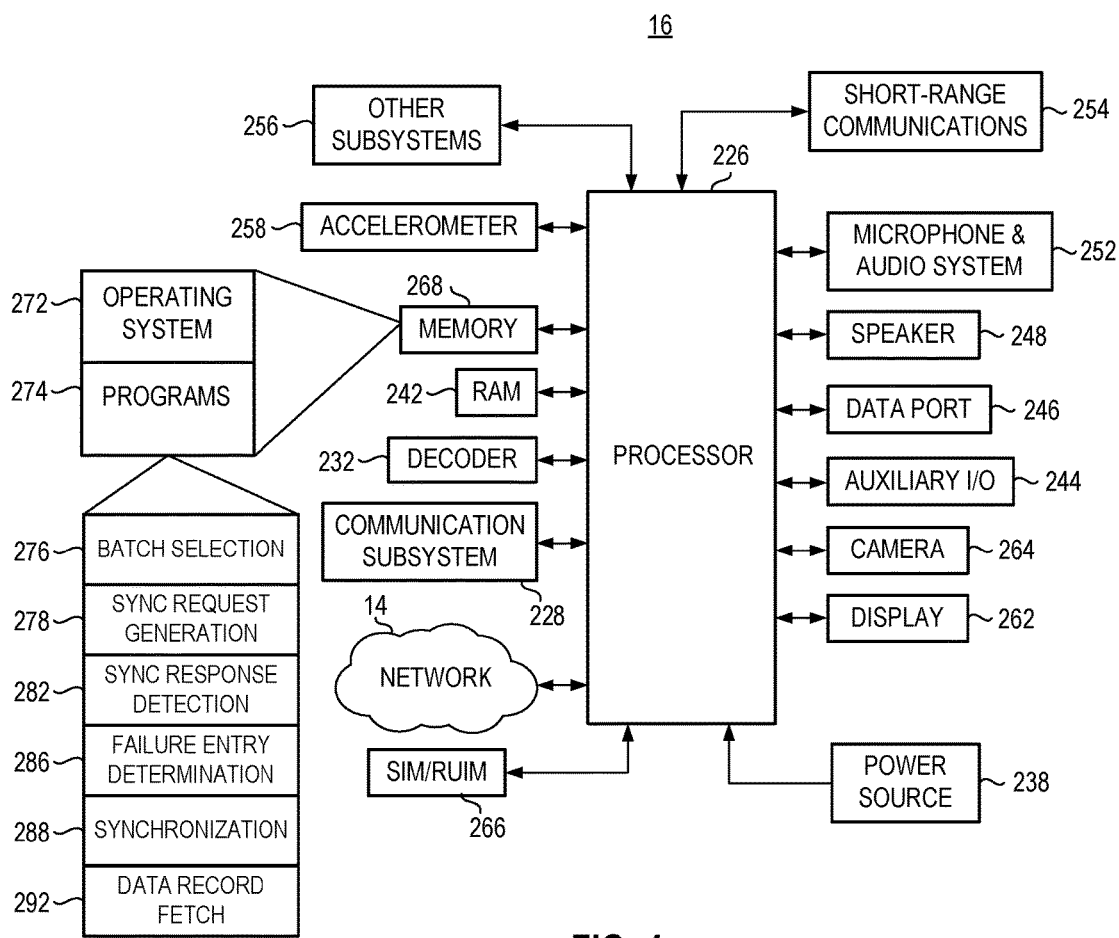
FIG. 4 illustrates a device forming a portion of the communication system shown in FIG. 1 pursuant to an implementation of the present disclosure.

FIG. 4 illustrates an exemplary device 16. An implementation of the device here forms a multi-functional, wireless device having data communication capability. The device 16 includes a processor 226 that controls operation of the device 16. The processor, for instance, controls voice, data, and command communications, which are implemented by a communication subsystem 228. The communication subsystem 228 includes radio transceiver elements, such as a radio receiver and a radio transmitter. The communication subsystem 228 is used, amongst other things, pursuant to initiation and support of an active voice call or other data communication session. The communication subsystem is formed in any desired manner using any combination of hardware, software, and firmware to perform various designated functions. The software is divided into software modules that are formed of program code. Software in one module is able to share or to call upon functions of another module during operation.

When the device 16 is operated pursuant to a communication service, the data received at the device is processed by a decoder 232. The decoder performs operations including decompression and decryption of the data. The device 16 also receives information from, and sends information to, the network 14. The network 14 is of any of various types of networks, such as a data network, a cellular network, a wireless data network, a wireless voice network, and a network that supports both voice and data communications. Any of a variety of formats and protocols are used by the network 14.

A power source 238 provides power to operate the elements of the device 16 to permit the various functions of the device to be performed. The power source 238 comprises, for instance, a battery power supply or forms a port to permit connection to an external power supply.

The processor 226 also interacts with other elements of the device 16. The processor 226, for instance, interacts with a random access memory (RAM) 242, an auxiliary input/output (I/O) subsystem 244, a data port 246, a speaker 248, a microphone and audio system 252, a short-range communication system 254, and other subsystems 256, an accelerometer 258, a display 262, and a camera module 264.

The processor 226 also interacts with a subscriber identity module or removable user identity module (SIM/RUIM) 266. Identification information is alternately stored at an internal memory of the device, such as the memory 268. The device 16 further includes an operating system 272 and other software programs 274, which are formed of program code. The operating system 272 and the software program 274 are executed by the processor 226 during operation of the device 16. The software program, here include a batch selection module 276, a synchronization request generation module 278, a synchronization response detection module 282, a failure entry determination module 286, a synchronization module 288, and a data record fetch module 292. The software modules 276-292 are operative to carry out the functions described above with respect to the apparatus 32 shown in FIG. 1.

Figure 5:
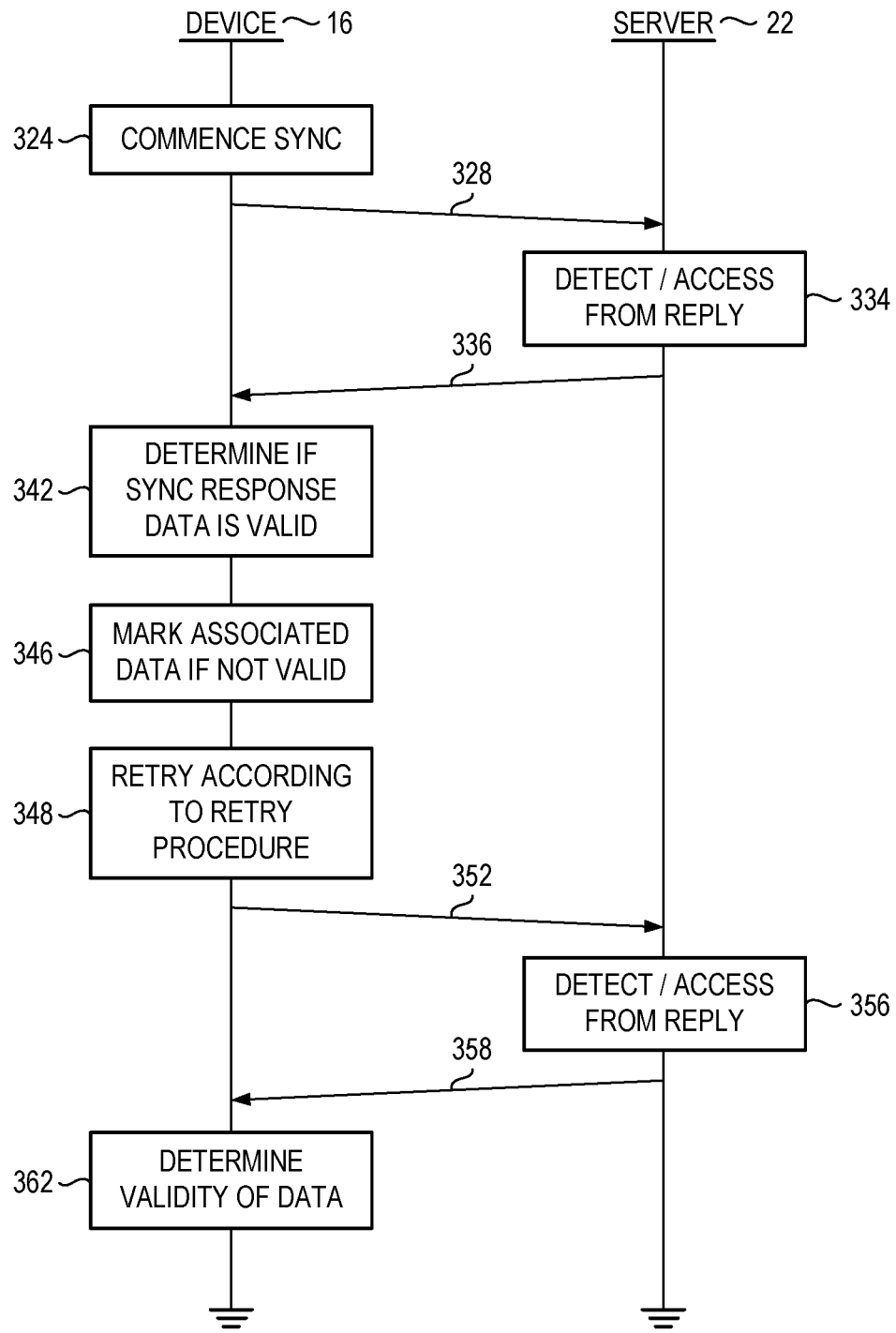
FIG. 5 illustrates a message sequence diagram representative of signaling generated during exemplary operation of an implementation of the present disclosure.

FIG. 5 illustrates a sequence diagram 322 representative of signaling generated during operation of the communication system 10 shown in FIG. 1. Communications between the device 16 and the server 22 are represented.

First, and as indicated by the block 324, synchronization commences, here indicated to be initiated at the device 16. A synchronization message is generated and sent, indicated by the segment 328, which is delivered to the server 22. The synchronization request is detected, the requested information is accessed, and a reply is formed, indicated by the block 334. A synchronization response is generated and sent, indicated by the segment 336.

The synchronization response is delivered to the device 16. A determination is made, indicated by the block 342, as to whether the synchronization response includes a failure entry, indicative of unsynchronizable data. If the data records associated with the synchronization request and response are indicated to be unsynchronizable, the associated data records are marked, indicated by the block 346, as being associated with a failed synchronization response. Portions of the marked data records are used pursuant to a retry procedure, indicated by the block 348 to retry synchronization.

A second synchronization request, indicated by the segment 352 is sent and delivered to the server 22. The server detects the request, accesses data associated with the request, and forms a reply, indicated by the block 356. The server generates and sends a synchronization response, indicated by the segment 358, in response to the second synchronization request 352. The response is delivered to the device 16, and a determination is made, indicated by the block 362, of the validity of the data and whether the data record can be synchronized.

Figure 6:
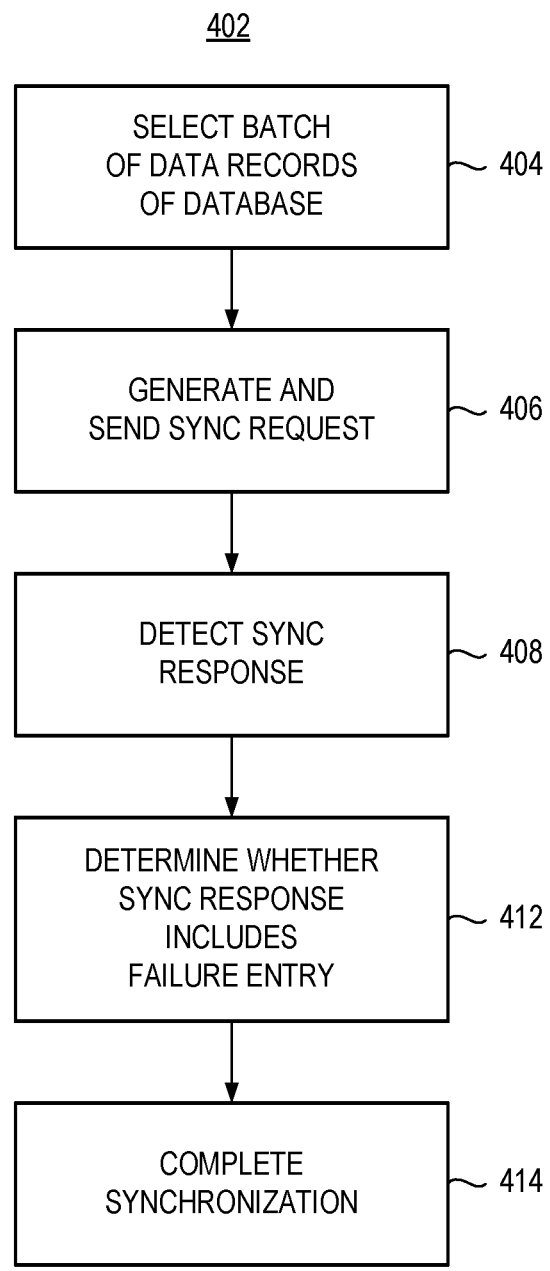
FIG. 6 illustrates a method flow diagram representative of the method of operation of an implementation of the present disclosure.

FIG. 6 illustrates a method flow diagram 402 representative of the method of operation of an implementation of the present disclosure.

First, and as indicated by the block 404, a selection is made of a batch of data records of a database. Then, and as indicated by the block 406, a synchronization request is generated and sent. Then, and as indicated by the block 408, a response to the synchronization request is detected.

A determination is made, indicated by the block 412, as to whether the synchronization response includes failure entry that causes synchronization failure of the batch of data. Then, and as indicated by the block 414, synchronization of the database is completed.

Synchronization is carried out in a manner that does not result in the occurrence of a retry group that causes invalidation of an account associated with the database.

Presently preferred implementations of the disclosure and many improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. A method for synchronizing a group of data objects of a mobile device dataset, the method comprising:
   identifying a plurality of batches of data objects related to the device dataset;
   iteratively processing each given batch of the plurality of batches, comprising:
      requesting synchronization of the given batch from a remote endpoint;
      responsive to detecting a synchronization response for the given batch indicates, for the given batch, that the remote endpoint is unable to synchronize the given batch, marking the given batch as unsynchronizable, the synchronization response being received in response to requesting synchronization of the given batch;
   after attempting to process all batches in the plurality of batches and responsive to determining there are one or more batches of the plurality of batches marked as unsynchronizable, performing the following:
      dividing each of the one or more batches marked as unsynchronizable into a plurality of subportions of data objects;
      based on dividing each of the one or more batches marked as unsynchronizable into a plurality of subportions of data objects, iteratively processing each given subportion, comprising:
         requesting synchronization of the given subportion;
         responsive to detecting a synchronization response for the given subportion indicates, for the given subportion, that remote endpoint is unable to synchronize the given subportion, marking the given subportion as unsynchronizable, the synchronization response being received in response to the requesting synchronization of the given subportion; and
      after processing each given subportion of the plurality of subportions and responsive to determining there are one or more subportions of the plurality of subportions marked as unsynchronizable, retrying synchronization of the one or more subportions marked as unsynchronizable.

2. The method of claim 1, wherein the retrying synchronization of the one or more subportions marked as unsynchronizable comprises sequentially attempting synchronization of each data record of the one or more subportions marked as unsynchronizable.

3. The method of claim 1, wherein the retrying synchronization of the one or more subportions marked as unsynchronizable comprises sequentially attempting synchronization of successively smaller fractional parts of the one or more subportions marked as unsynchronizable.

4. The method of claim 1,
   wherein the retrying synchronization of the one or more subportions marked as unsynchronizable comprises sequentially attempting synchronization of successively smaller fractional parts of the one or more subportions marked as unsynchronizable until synchronizable data objects indicated to be unsynchronizable are synchronized, and
   the method further comprising, subsequent to sequentially attempting synchronization of successively smaller fractional parts, completing synchronization of the device dataset with unsynchronizable data objects of the one or more successively smaller fractional parts of the one or more subportions marked as unsynchronizable left unsynchronized and marked as unsynchronized.

5. The method of claim 1, further comprising marking each data record in the one or more batches marked as unsynchronizable as an entry for which synchronization should not be immediately attempted.

6. The method of claim 1, wherein synchronization of the device dataset is completed exclusive of the one or more batches marked as unsynchronizable.

7. The method of claim 1, further comprising marking as unsynchronizable each data record in the one or more batches that is marked as unsynchronizable.

8. A device for synchronizing data objects of a device dataset, the device comprising:
   memory storing the device dataset; and
   a processor configured to at least:
   divide the device dataset into a plurality of batches of data objects;
   iteratively process each given batch of the plurality of batches, comprising:
      requesting synchronization of the given batch from a remote endpoint;
      responsive to detecting a synchronization response for the given batch indicates, for the given batch, that the remote endpoint is unable to obtain synchronization data to synchronize the given batch, marking the given batch as unsynchronizable, the synchronization response being received in response to requesting synchronization of the given batch;
   after processing all batches in the plurality of batches and responsive to determining there are one or more batches of the plurality of batches marked as unsynchronizable, perform the following:
      divide each of the one or more batches marked as unsynchronizable into a plurality of subportions of data objects;
      based on dividing each of the one or more batches marked as unsynchronizable into a plurality of subportions of data objects, iteratively process each given subportion, comprising:
         requesting synchronization of the given subportion;
         responsive to detecting a synchronization response for the given subportion indicates, for the given subportion, that remote endpoint is unable to obtain synchronization data to synchronize the given subportion, marking the given subportion as unsynchronizable, the synchronization response being received in response to requesting synchronization of the given subportion; and after processing each given subportion of the plurality of subportions and responsive to determining there are one or more subportions of the plurality of subportions marked as unsynchronizable, retry synchronization of the one or more subportions marked as unsynchronizable.

9. The device of claim 8, wherein, when retrying the synchronization of the one or more subportions marked as unsynchronizable, the processor is further configured to sequentially attempt synchronization of each data record of the one or more subportions marked as unsynchronizable.

10. The device of claim 8, wherein, when retrying synchronization of the one or more subportions marked as unsynchronizable, the processor is further configured to sequentially attempt synchronization of successively smaller fractional parts of the one or more subportions marked as unsynchronizable.

11. The device of claim 8, wherein, when retrying the synchronization of the one or more subportions marked as unsynchronizable, the processor is further configured to sequentially attempt synchronization of successively smaller fractional parts of the one or more subportions marked as unsynchronizable until synchronizable data objects indicated to be unsynchronizable are synchronized and the processor further configured to, subsequent to sequentially attempting synchronization of successively smaller fractional parts, complete synchronization of the device dataset with unsynchronizable data objects of the one or more successively smaller fractional parts of the one or more subportions marked as unsynchronizable left unsynchronized and marked as unsynchronized.

12. The device of claim 8, wherein the processor is further configured to mark each data record in the one or more batches marked unsynchronizable as an entry for which synchronization should not be immediately attempted.

13. The device of claim 8, wherein synchronization of the device dataset is completed exclusive of the one or more batches marked as unsynchronizable.

14. A non-transitory computer readable medium comprising computer executable instructions for synchronizing data objects of a device dataset, the instructions comprising:

dividing the device dataset into a plurality of batches of data objects;

iteratively processing each given batch of the plurality of batches, comprising:

requesting synchronization of the given batch from a remote dataset endpoint; and responsive to detecting a synchronization response for the given batch indicates, for the given batch, that the remote dataset endpoint is unable to obtain synchronization data to synchronize the given batch, marking the given batch as unsynchronizable, the synchronization response being received in response to requesting synchronization of the given batch;

after processing all batches in of the plurality of batches and responsive to determining there are one or more batches of the plurality of batches marked as unsynchronizable, perform the following:

dividing each of the one or more batches marked as unsynchronizable into a plurality of subportions of data objects;

based on dividing each of the one or more batches marked as unsynchronizable into a plurality of subportions of data objects, iteratively processing each given subportion, comprising:

requesting synchronization of the given subportion; and responsive to detecting a synchronization response for the given subportion indicates, for the given subportion, that remote dataset endpoint is unable to obtain synchronization data to synchronize the given subportion, marking the given subportion as unsynchronizable, the synchronization response being received in response to requesting synchronization of the given subportion; and after processing each given subportion of the plurality of subportions and responsive to determining there are one or more subportions of the plurality of subportions marked as unsynchronizable, retrying synchronization of the one or more subportions marked as unsynchronizable.

15. The non-transitory computer readable medium of claim 14, wherein the retrying synchronization of the one or more subportions marked as unsynchronizable comprises sequentially attempting synchronization of each data record of the one or more subportions marked as unsynchronizable.

16. The non-transitory computer readable medium of claim 14, wherein the retrying synchronization of the one or more subportions marked as unsynchronizable comprises sequentially attempting synchronization of successively smaller fractional parts of the one or more subportions marked as unsynchronizable.

17. The non-transitory computer readable medium of claim 14, wherein the retrying synchronization of the one or more subportions marked as unsynchronizable comprises sequentially attempting synchronization of successively smaller fractional parts of the one or more subportions marked as unsynchronizable until synchronizable data objects indicated to be unsynchronizable are synchronized, and the instructions further comprising, subsequent to sequentially attempting synchronization of successively smaller fractional parts, completing synchronization of the device dataset with unsynchronizable data objects of the one or more successively smaller fractional parts of the one or more subportions marked as unsynchronizable left unsynchronized and marked as unsynchronized.

18. The non-transitory computer readable medium of claim 14, further comprising marking each data record in the one or more batches marked as unsynchronizable as an entry for which synchronization should not be immediately attempted.

19. The non-transitory computer readable medium of claim 14, wherein synchronization of the device dataset is completed exclusive of the one or more batches marked as unsynchronizable.

* * * * *